(12) United States Patent
Baldassari et al.

(10) Patent No.: US 8,353,111 B2
(45) Date of Patent: Jan. 15, 2013

(54) HANDLE CONTROL PROVIDED WITH AN ANGULAR POSITION SENSOR

(75) Inventors: Andrea Baldassari, Bologna (IT); Roberto Piciotti, Bologna (IT); Domenico Cannone, Bologna (IT); Maurizio Xella, Bologna (IT)

(73) Assignee: Magneti Marelli S.p.A., Corbetta (ID)

( * ) Notice: Subject to any disclaimer, the term of this patent is extended or adjusted under 35 U.S.C. 154(b) by 810 days.

(21) Appl. No.: 12/549,980

(22) Filed: Aug. 28, 2009

(65) Prior Publication Data
US 2010/0126299 A1 May 27, 2010

(30) Foreign Application Priority Data

Nov. 26, 2008 (EP) .................................... 08425761
May 19, 2009 (EP) .................................... 09160703

(51) Int. Cl.
*G01B 21/22* (2006.01)
(52) U.S. Cl. ........................................................ 33/1 PT
(58) Field of Classification Search .................. 33/1 PT, 33/706
See application file for complete search history.

(56) References Cited

U.S. PATENT DOCUMENTS

| 2,908,192 | A * | 10/1959 | Varney ........................... 33/1 PT |
| 6,327,791 | B1 * | 12/2001 | Norcross et al. ................. 33/706 |
| 6,832,511 | B2 | 12/2004 | Samoto et al. |
| 7,855,552 | B2 * | 12/2010 | Steinich ........................ 33/1 PT |
| 7,911,204 | B2 * | 3/2011 | Chen .............................. 33/1 PT |
| 2005/0066536 | A1 * | 3/2005 | Hildner et al. .................. 33/706 |
| 2008/0154537 | A1 | 6/2008 | Gamberini et al. |
| 2010/0017062 | A1 * | 1/2010 | Muller et al. ................. 33/1 PT |

FOREIGN PATENT DOCUMENTS

| EP | 1 464 571 A2 | 10/2004 |
| EP | 1 876 339 A | 1/2008 |
| FR | 2 812 854 A | 2/2002 |
| WO | WO-2008/010186 A2 | 1/2008 |

OTHER PUBLICATIONS

Partial European Search Report of EP 09 16 0703 A dated Dec. 18, 2009.

* cited by examiner

*Primary Examiner* — G. Bradley Bennett
(74) *Attorney, Agent, or Firm* — Venable LLP; Robert Kinberg

(57) ABSTRACT

A handle control provided with: a supporting body, which is provided with a central through hole and is adapted to be fitted about a handlebar to be rigidly fixed to the handlebar; a twist grip, which has a tubular shape, is rotationally carried by the supporting body and is centrally perforated to be fitted about the handlebar so as to rotate with respect to the handlebar; and an angular position sensor, which is adapted to read the angular position of the twist grip; the angular position sensor has at least one rotor, which is supported by the twist grip to rotate along with the twist grip and is adapted to influence an electric field; and at least one reader, which is carried in a stationary position by the supporting body, is arranged close to the rotor, and is suitable for a contactless and remote reading of the orientation of the rotor.

18 Claims, 12 Drawing Sheets

HANDLE CONTROL PROVIDED WITH AN ANGULAR POSITION SENSOR

CROSS-REFERENCE TO RELATED APPLICATION

This application claims the priority of European Patent Application No. 08425761.7 filed Nov. 26, 2008 and European Patent Application No. 09160703.6 filed May 19, 2009, the subject matter of which is incorporated herein by reference.

TECHNICAL FIELD

The present invention relates to a handle control provided with an angular position sensor.

The present invention is advantageously applied to a motorcycle, to which explicit reference will be made in the following description without hence loosing in generality.

BACKGROUND ART

A traditional motorcycle comprises a handle control (conventionally the grip on the right of the handlebar), which is rotationally mounted and mechanically connected to an engine control which adjusts the generation of the driving torque. Normally, the handle control is connected to the engine control by means of at least one Bowden-type metal cable, which is inserted into an external sheath to slide with respect to the sheath and is biased by a spring towards a rest position corresponding to a zero driving torque.

Recently, deriving from the experience accrued in the automotive industry, the application of DBW (Drive By Wire) systems has been suggested, in which the handle control is no longer mechanically connected to the engine control, but is connected to a position sensor only, which detects the position of the handle control, and therefore drives an actuator which mechanically operates the engine control.

The greatest issue that needs to be addressed in designing a DBW system suitable for being used on a motorcycle is the implementation of an acquisition system for detecting the angular position of the handle control. Indeed, such an acquisition system must be able to provide a rapid and errorless interpretation of the driver's intention of accelerating/decelerating, must provide information redundancy so as to ensure certain interpretation of the driver's intention by an engine control unit, and must be installable in the context of a motorcycle taking into account the issues related to the volumes, the high vibrations which may occur on a motorcycle, and to the adverse environmental conditions related to the lack of protection (accidental shocks, very low or very high temperature, water splashes, etc.).

Furthermore, an acquisition system suitable for being used in a motorcycle must be highly versatile in order to be easily integrated even on very different motorcycles, because the production of motorcycles is highly fragmented and characterized by a vast production of models often in small numbers.

In the automotive field, there are various solutions for implementing an acquisition system for detecting the position of the gas pedal; however, such automotive solutions may not be used on a motorcycle as they are too cumbersome and not rugged enough. Furthermore, in motorcycle applications, the safety and rapidity of interpreting the driver's intention is even more important than in automotive applications, because a car resting on four wheels is intrinsically stable, and thus a short discrepancy between the delivered driving torque and the driver's intention is tolerable (i.e. is essentially not dangerous) when driving a car; instead, a motorcycle resting on two wheels only is intrinsically unstable and is based on a dynamic balance which may be easily upset, even by a short discrepancy between the delivered driving torque and the driver's intention (particularly under limit conditions, such as while cornering).

Patent application US20080154537A1 suggested an acquisition system for detecting the angular position of a motorcycle handle control; the acquisition system is provided with: a fixed supporting body; a movable element, which is movably mounted in the supporting body; a transmission device mechanically connected to the handle control and to the movable element to transmit the motion of the handle control to the movable element; a main position sensor, which is carried by the supporting body, is coupled to the movable element to determine the angular position of the movable element, and is adapted to provide two reciprocally redundant measurements of the angular position of the movable element; and a control position sensor, which is different and independent from the main position sensor, is carried by the supporting body, is coupled to the movable element to determine the position of the movable element, and is adapted to provide two reciprocally redundant measurements of the position of the movable element.

The acquisition system described in patent application US20080154537A1 is very rugged and reliable, but on the other hand has relatively high volumes and requires a mechanical connection by means of Bowden cables between the handle control and the movable element mounted in the fixed supporting body.

U.S. Pat. No. 6,832,511B2 describes an angular position sensor for detecting the angular position of a motorcycle handle control; the position sensor is installed by the side of the handle control and comprises a double potentiometer, which provides two reciprocally redundant measurements of the position of the movable element and is provided with a rotating shaft which is made angularly integral with the handle control by means of a mechanical transmission device.

The angular position sensor described in patent U.S. Pat. No. 6,832,511B2 has the drawback of being not very reliable, because the use of a potentiometer arranged at one end of the handlebar is very problematic due to the high vibrations present in this area; in other words, a potentiometer provides for a sliding contact between one or more movable sliders and a fixed plate, and such a sliding contact is very sensitive to mechanical vibrations. During the normal run of a motorcycle, the ends of the handlebar are subjected to very high vibrations due to the amplifying effect of the handlebar (i.e. a vibration transmitted to the handlebar at a central area of fastening the handlebar to the front fork is multiplied by the arms of the handlebar and is thus greatly amplified at the ends of the handlebar). Such vibrations may negatively affect the reading provided by the potentiometer, because they may cause undesired, uncontrolled oscillations on the position of the potentiometer sliders, which cause a high degree of uncertainty on the measurement provided by the potentiometer; furthermore, over time, such vibrations may deteriorate the potentiometer thus determining early, unpredictable wear with negative potential impacts on the driver's safety.

Patent application WO2008010186A2 discloses a twist-grip control device for motor vehicles comprising: a stator portion which is stationary in operation, a rotor portion which may be gripped and which is mounted such that it can be manually rotated about an axis with respect to the stator portion, against the action of an opposing spring, a first and a second permanent magnet connected to the rotor portion in respective separate angular fields about said axis and adapted to generate respective predetermined angular distributions of magnetic field intensity about said axis, first and second magnetic field sensors connected to the stator portion in respective separate angular positions about said axis, and associated with the first and second permanent magnets respectively in order to provide, when the rotor portion; is rotated by a certain angle with respect to the stator portion, respective first and second electrical signals indicative of the relative angular position of the rotor portion. These signals are correlated with one another in a predetermined relationship such that one of the signals may be used as a control signal indicative of the extent of an associated controlled physical magnitude desired by the user, and the other signal may be used as a control signal adapted to enable the detection of the occurrence of operating malfunctions or failures when these signals are no longer correlated with one another in the predetermined relationship.

The position sensors used in the handle control device of patent application WO2008010186A2 require the use of permanent magnets for determining the angular position of the handle; however, using permanent magnets is relatively unsafe, because the magnetic field generated by these permanent magnets may be affected in an undesired, unexpected manner by surrounding metal objects (e.g. metal rings carried by the driver's right hand or metal reinforcements inserted in a glove worn on the driver's right hand) with a consequent deterioration of accuracy and speed in reading the angular position of the handle.

DISCLOSURE OF INVENTION

It is the object of the present invention to provide a handle control provided with an angular position sensor, which handle control is free from the above-described drawbacks and specifically which is easy and cost-effective to be implemented.

According to the present invention, a handle control provided with an angular position sensor is provided as claimed in the attached claims.

BRIEF DESCRIPTION OF THE DRAWINGS

The present invention will now be described with reference to the accompanying drawings, which illustrate some non-limitative embodiments thereof, in which.

PREFERRED EMBODIMENTS OF THE INVENTION

Figure 1:
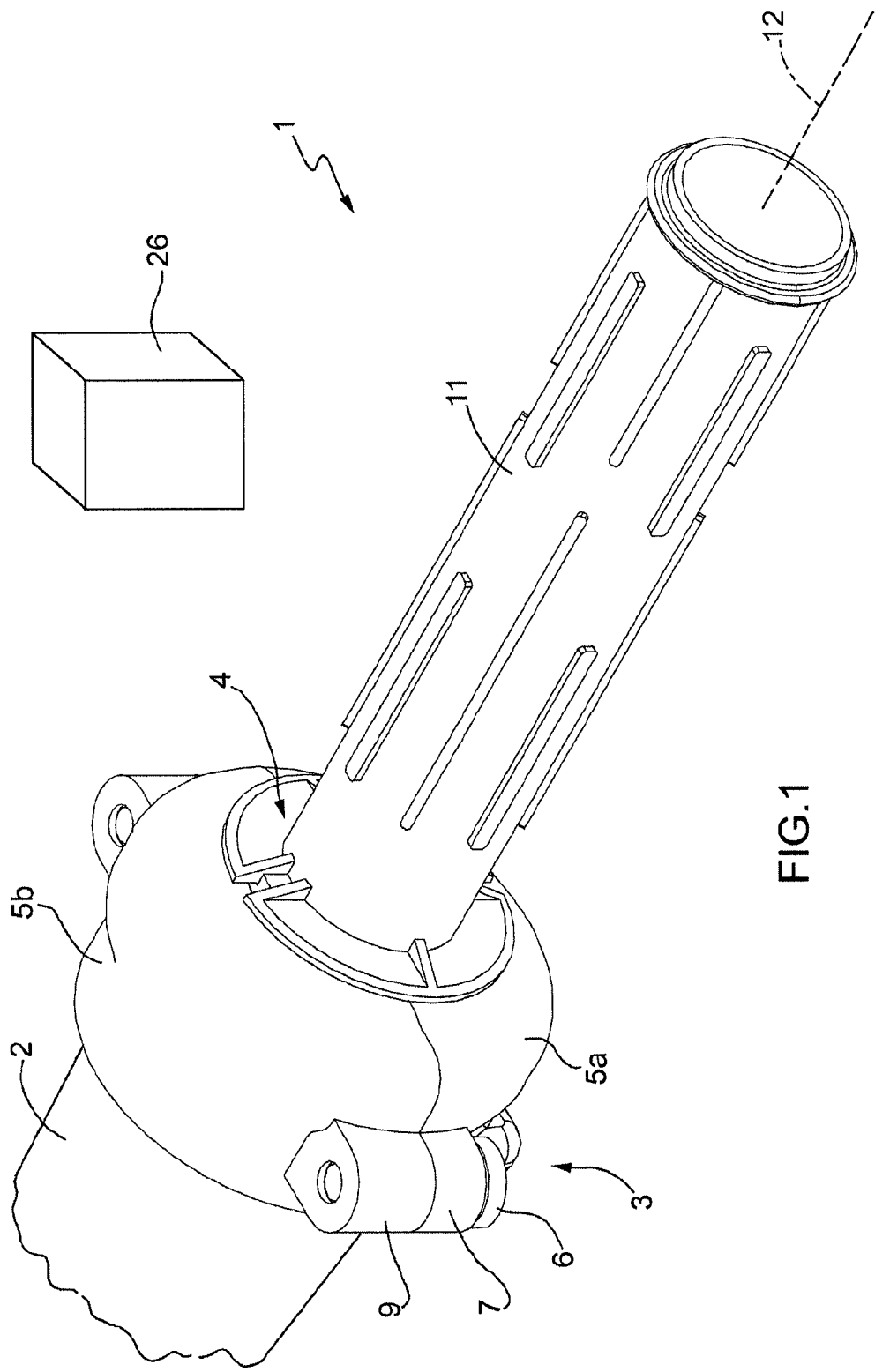
FIG. 1 is a diagrammatic perspective view, with parts removed for clarity, of a handle control provided with an angular position sensor and made in accordance with the present invention.

In FIG. 1, numeral 1 indicates as a whole a handle control which is mounted on a handlebar 2 of a motorcycle.

Figure 2:
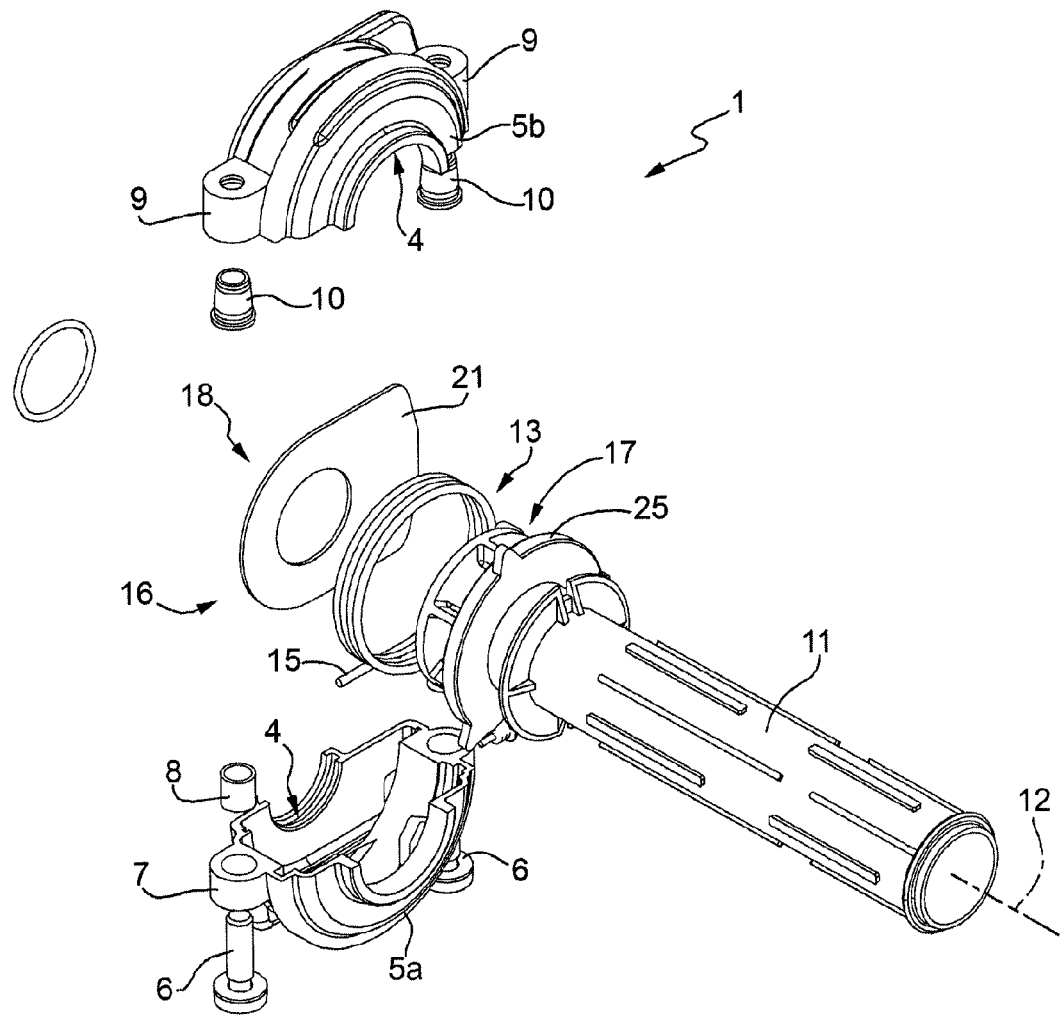
FIG. 2 is a diagrammatic exploded perspective view, with parts removed for clarity, of the handle control in FIG. 1.

The handle control 1 comprises a supporting body 3, which is shaped as an annular shell, is provided with a central through hole 4 (shown in FIGS. 2 and 3) and is adapted to be fitted about the handlebar 2 to be rigidly fixed to the handlebar 2. As shown in FIG. 2, the supporting body 3 is made of molded plastic material and consists of two parts 5 which are reciprocally secured about the handlebar 2 and clamp onto the handlebar 2 by means of a pair of screws 6. Specifically, one part 5a has two slots 7, which define two respective through holes which are covered by two respective metal bushings 8 and are engaged by the screws 6; the other part 5b has two slots 9, which are aligned with the slots 7 of the part 5a, and define two respective blind holes which are covered by two respective threaded metal bushings 10 in which the screws 6 are screwed.

Furthermore, the handle control 1 comprises a twist grip 11, which has a tubular shape, is rotationally carried by the supporting body 3 and is centrally perforated to be fitted about the handlebar 2 so as to freely rotate with respect to the handlebar 2 about a longitudinal rotation axis 12. The grip 11 is made of a rigid plastic material by means of injection molding and serves a structural function; the grip 11 is coated by means of an external coating (not shown in the accompanying figures) made of plastic material which has both an aesthetic purpose and a functional purpose because it must ensure an optimal grip for the driver.

An elastic recalling element 13 (specifically, a spiral spring) is arranged in the supporting body 3, which has one end 14 coupled to the twist grip 11 and one end 15 opposite to the end 14 secured to the supporting body 3; in this manner, the elastic recalling element 13 exerts an elastic thrust on the grip 11, which tends to rotate the twist grip 11 towards a rest position corresponding to a zero driving torque.

Finally, the handle control 1 comprises an angular position sensor 16, which is adapted to read the angular position α of the twist grip 11 about the longitudinal rotation axis 12 for a DBW-type (Drive By Wire) control system.

The angular position sensor 16 comprises a rotor 17, which is supported by the twist grip 11 in order to rotate along with the twist grip 11 about the longitudinal rotation axis 12 and is able to influence an electric and/or magnetic field (either by modifying an existing electric and/or magnetic field, or by generating its own electric and/or magnetic field). Furthermore, the angular position sensor 16 comprises a reader 18, which is carried in a stationary position by the supporting body 3, is arranged close to the rotor 17, and is suitable for a contactless and remote reading of the orientation of the rotor 17. According to a preferred embodiment, the reader 18 is adapted to read the orientation of the rotor 17 to provide three reciprocally redundant measures of the angular position α of the handle control 1.

Figure 4:
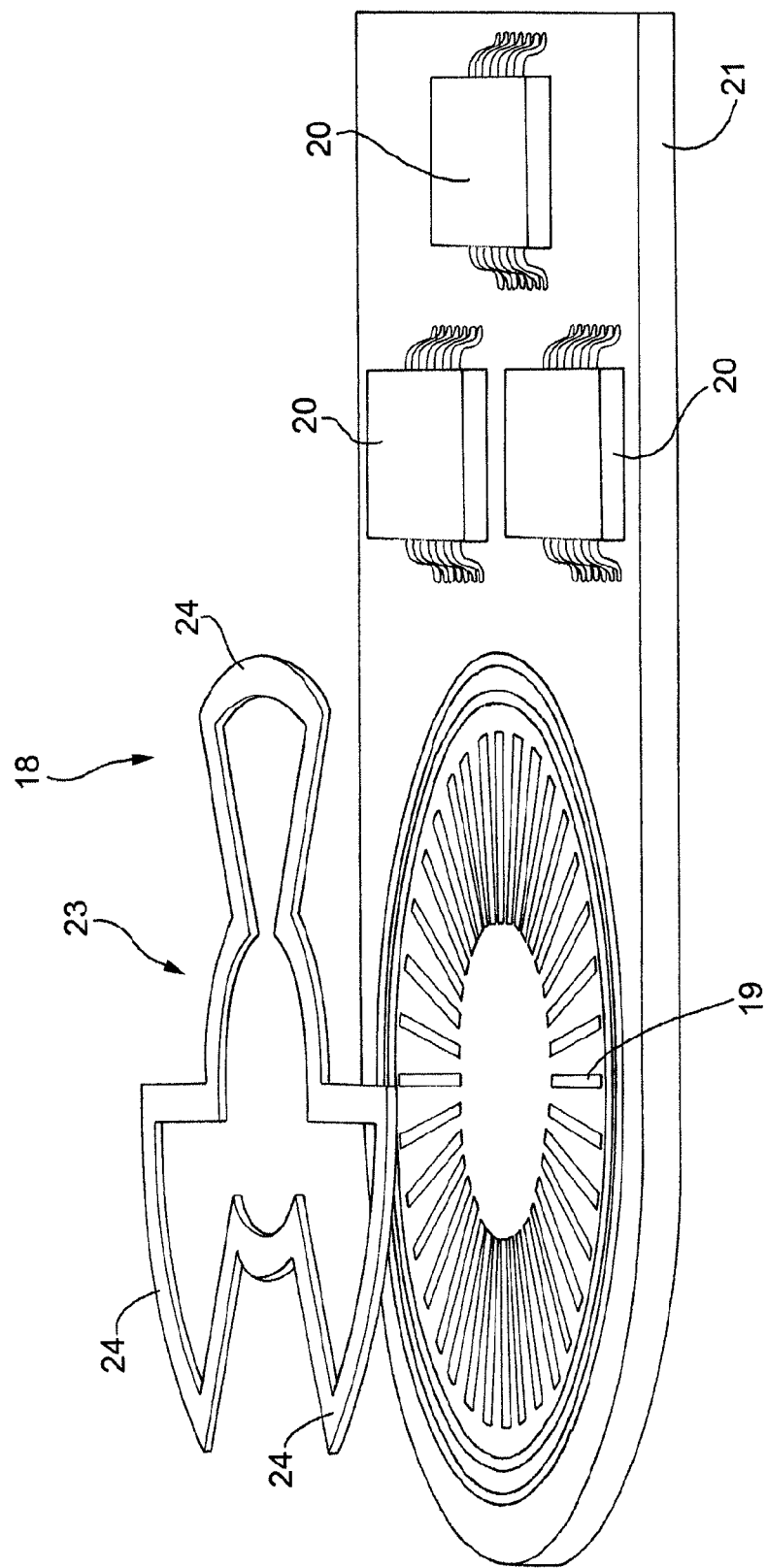
FIG. 4 is a diagrammatic perspective view, with parts removed for clarity, of the angular position sensor of the handle control in FIG. 1.

As shown in greater detail in FIG. 4, the reader 18 comprises a plurality of antennas 19 and three electronic querying devices 20, which are carried by a common printed circuit 21 arranged inside the supporting body 3 and are connected to the antennas 19. Each antenna 19 is constituted by at least one closed loop turn and is preferably constituted by a coil.

The rotor 17 comprises a closed turn 23 which is made of electrically conductive material and has a number of lobes 24 distributed about the longitudinal rotation axis 12 of the twist grip 11; each antenna 19 is facing and coupled to the turn 23 of the rotor 17 and is connected to at least one electronic querying device 20. In use, each electronic querying device 20 uses at least one antenna 19 to generate an electric field, which is reflected by the turn 23 of the rotor 17 and then the electronic querying device 20 reads the electric field reflected by the turn 23 of the rotor 17.

According to a preferred embodiment, each electronic querying device 20 comprises its own antenna 19, not depending on the antennas 19 of the other readers 18; the antennas 19 are generally concentric to one another and are arranged one inside the other. The antenna 19 are always obtained on a first surface of the printed circuit 21 facing the rotor 17, while the electronic querying device 20 may be fixed to the first surface (as shown in FIG. 4) of the printed circuit 21, or may be fixed to a second surface of the printed circuit 21 opposite to the first surface.

It is worth noting that in the angular position sensor 18, the active components (therefore more delicate and potentially subject to faults or malfunctions) are the electronic querying devices 20, while all the other components (antennas 19, turn 23, printed circuit 21) are passive and very unlikely to be subject to faults or malfunctions unless they undergo exceptional mechanical stresses (i.e. to violent crashes due to the motorcycle fall); therefore, in order to contain costs and volumes without appreciable reductions of reliability, it has been chosen to triplicate the electronic querying devices 20 only (alternatively, the electronic querying devices 20 could be duplicated, i.e. it would be possible to use only two electronic querying devices 20 instead of three electronic querying devices 20).

Figure 3:
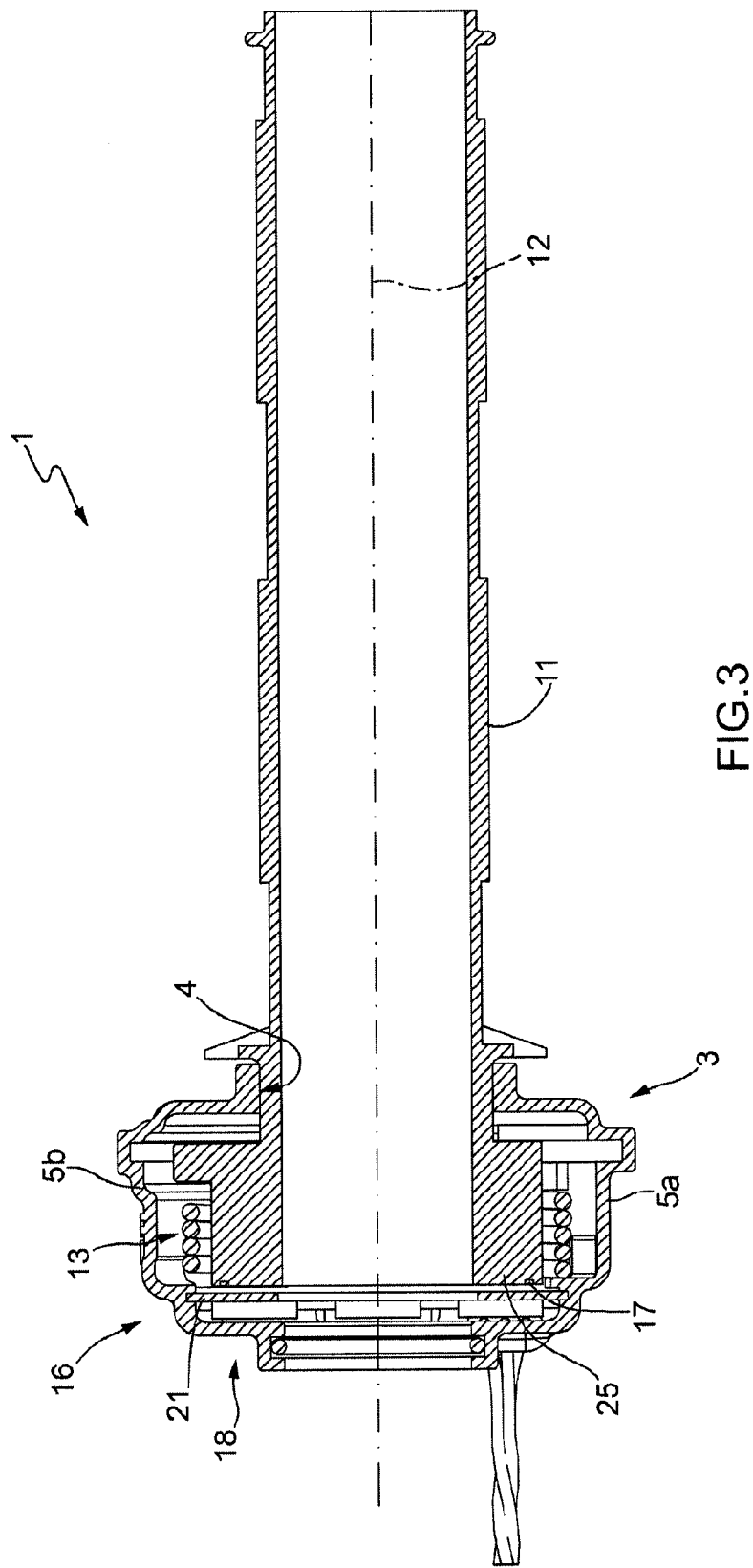
FIG. 3 is a diagrammatic longitudinal-section view, with parts removed for clarity, of the handle control in FIG. 1.

Preferably, as shown in FIGS. 2 and 3, the twist grip 11 comprises an annular-shaped support edge 25, which supports the rotor 17 and is arranged at an internal end of the twist grip 11, accommodated inside the supporting body 3. The twist grip 11 is made of plastic material by means of molding, and preferably the rotor 17 is co-molded onto the twist grip 11 in order to be integrated within the twist grip 11.

The three electronic querying devices 20 of the position sensor 16 provide three reciprocally redundant measurements of the angular position α of the twist grip 11; such measurements are supplied to a processing unit 26 (shown in FIG. 1), which uses the measurements themselves for determining the angular position α of the twist grip 11 (i.e. of the handle control 1) with a high degree of safety. Specifically, the processing unit 26 uses one of the three available measurements for determining the angular position α of the twist grip 11, while it uses all three available measurements for checking the correct operation of the three readers 18 of the position sensor 16, i.e. to check and validate the angular position α of the twist grip 11. In other words, the processing unit 26 uses the cross comparison between the three available measurements for diagnosing possible malfunctions of the three readers 18 of the position sensor 16 and determines the angular position α of the handle control 1 using at least one measurement provided by a correctly operating reader 18.

The processing unit 26 uses the angular position α of the twist grip 11 (i.e. of the handle control 1) to supervise the operation of a motorcycle engine, and uses the angular position α of the twist grip 11 to adjust the driving torque generation.

Generally, two readers 18 provide two measurements of the actual angular position α of the twist grip 11 having complementary values so that the sum of the two measurements is always constant, while a third reader could provide an indication whether the twist grip 11 is in a given position or not (generally in the rest position corresponding to a zero driving torque), i.e. could provide a true-or-false type indication. The angular rest position α is the most important because the greatest danger in case of malfunction of a DBW system is not realizing that the driver requires to cancel the driving torque generation, and thus accelerating the motorcycle against the driver's intention.

Figure 5:
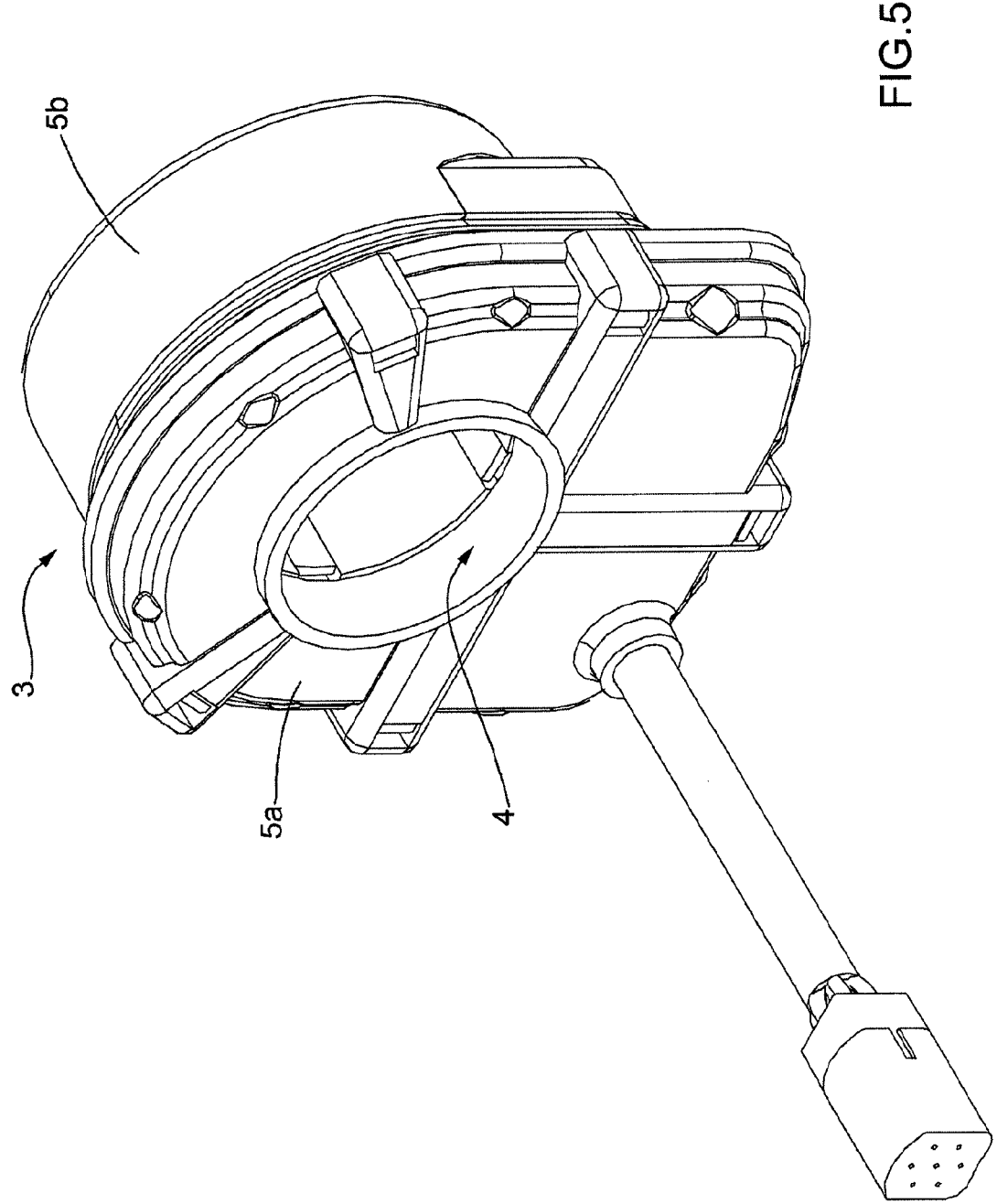
FIG. 5 is a diagrammatic perspective view, with parts removed for clarity, of a different embodiment of a supporting body of the handle control in FIG. 1.
Figure 6:
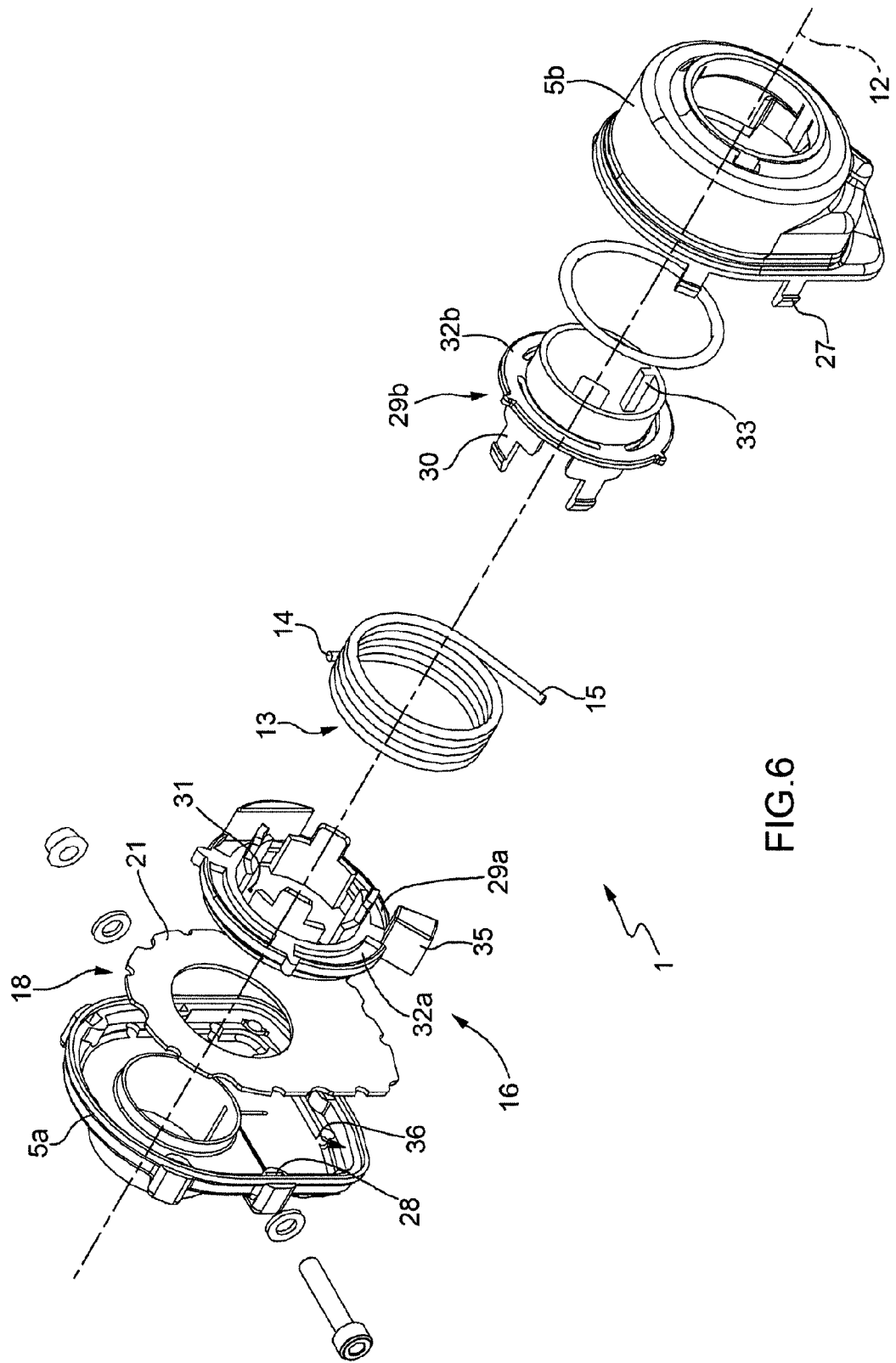
FIG. 6 is a diagrammatic, exploded perspective view, with parts removed for clarity, of the supporting body in FIG. 5.
Figure 7:
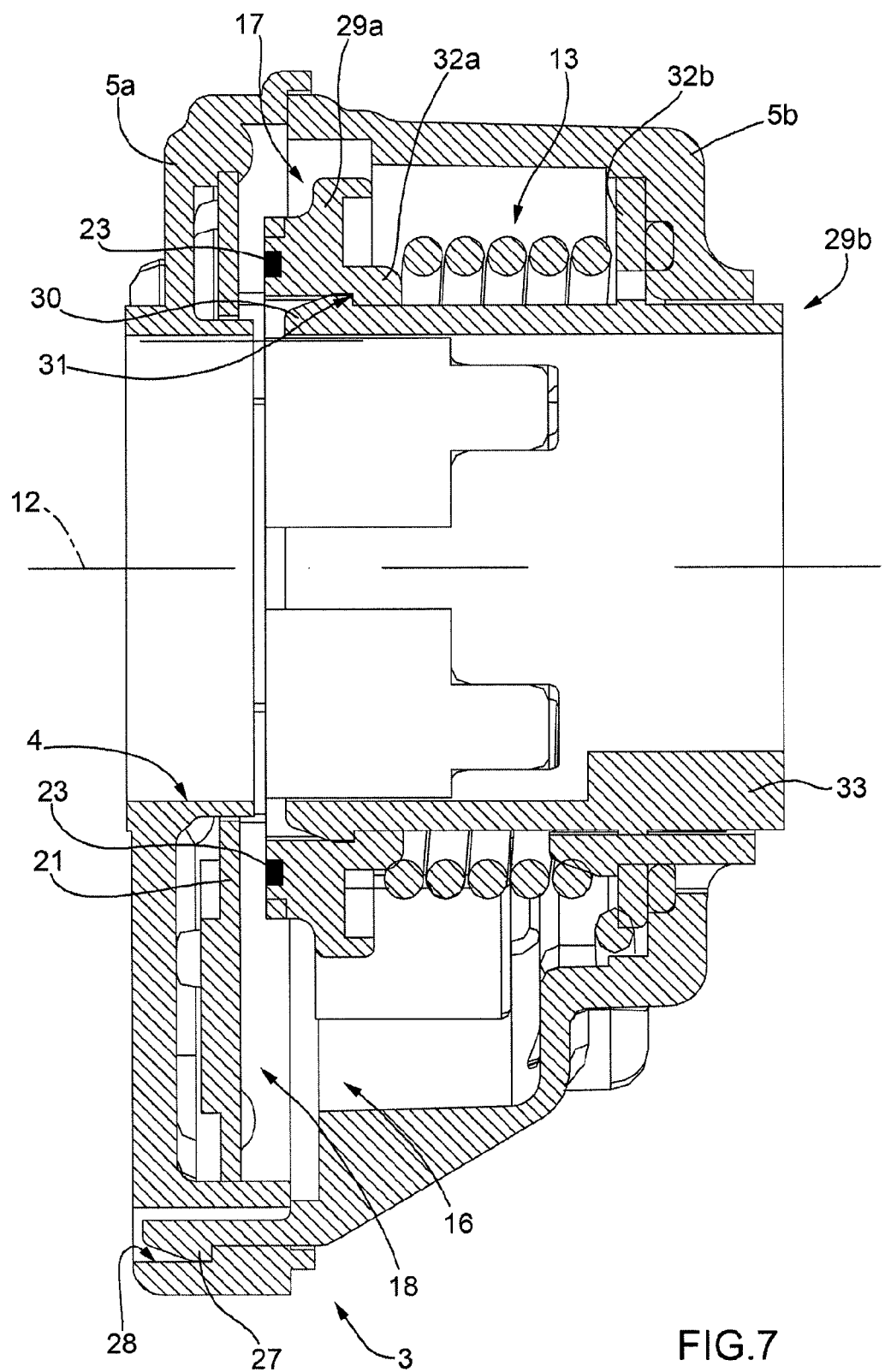
FIG. 7 is a diagrammatic, longitudinal section view, with parts removed for clarity, of the supporting body in FIG. 5.

In the different embodiment shown in FIGS. 5-7, the supporting body 3 has a different shape and the two parts 5 which form the supporting body 3 are axially divided instead of being radially divided; in other words, in the embodiment shown in FIGS. 1-3, the two parts 5a and 5b are each half-ring-shaped and are radially joined (i.e. perpendicularly to the rotation axis 12) to form the supporting body 3; in the embodiment shown in FIGS. 5-7, instead, the two parts 5a and 5b are each ring-shaped and are axially joined (i.e. parallelly to the rotation axis 12) to form the supporting body 3.

Furthermore, the two parts 5a and 5b which form the supporting body 3 are mechanically joined to each other by means of an interlocking system consisting of elastically deformable fasteners 27 protruding from the half 5b which interlock at corresponding seats 28 obtained in the half 5a. Therefore, in the embodiment shown in FIGS. 5-7, the supporting body 3 is free from the screws 6, the function of which is replaced by the interlocking system.

The rotor 17 supporting the closed turn 23 is divided into two parts 29a and 29b, each of which has an annular shape centrally perforated to be arranged about the handlebar 2. The two parts 29a and 29b of the rotor 17 are mechanically coupled to each other by means of an interlocking system consisting of elastically deformable fasteners 30 protruding from the part 29b which interlock into corresponding seats 31 obtained in the part 29a. The interlocking system essentially serves the function of axially constraining the two parts 29a and 29b of the rotor 17; furthermore, the two parts 29a and 29b of the rotor 17 further have a shaped interlocking point therebetween to make the two parts 29a and 29b themselves angularly integral with each other. The elastic element 13 is inserted between the two parts 29a and 29b of the rotor 17, which elastic element 13 is axially contained between the two parts 29a and 29b themselves; in other words, the two parts 29a and 29b of the rotor 17 define a seat therebetween, in which the elastic element 13 is accommodated and which axially contains the elastic element 13 itself (i.e. prevents the elastic element 13 from axially moving). In order to define the housing seat of the elastic element 13, both the parts 29a and 29b of the rotor 17 comprise respective annular edges 32a and 32b.

Figure 9:
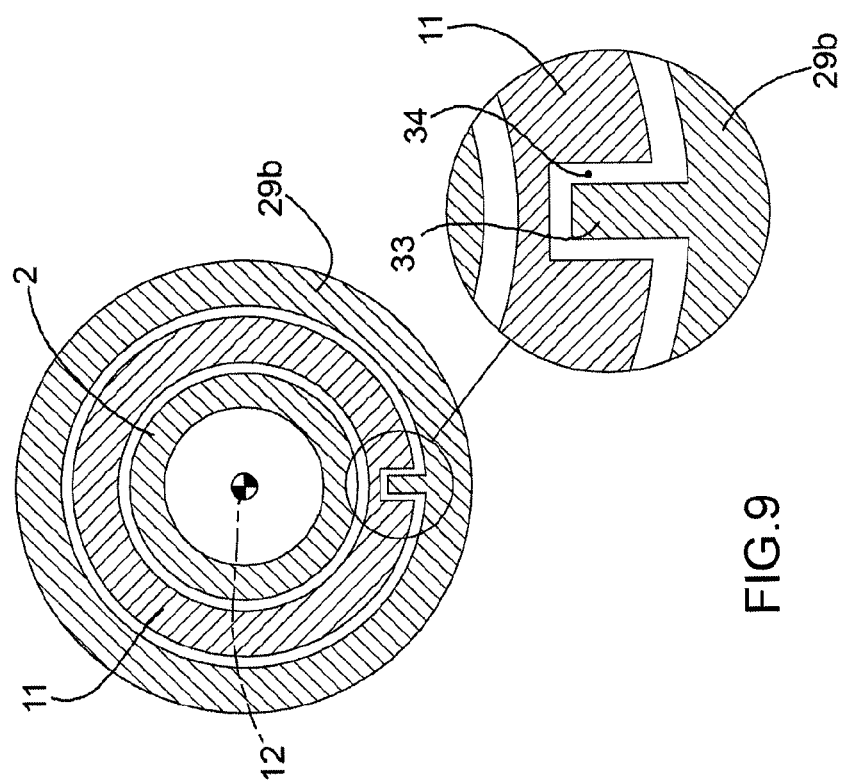
FIG. 9 is a diagrammatic, cross section view, with parts removed for clarity, of a detail of the twist grip in FIG. 8.
Figure 8:
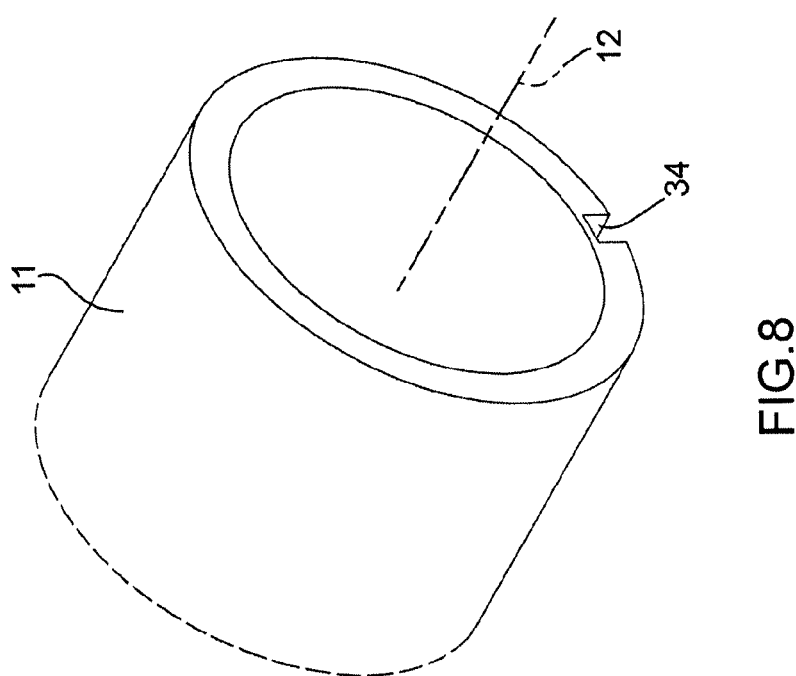
FIG. 8 is a diagrammatic perspective view, with parts removed for clarity, of a detail of a twist grip which is coupled to the supporting body in FIG. 5.

The part 29b of the rotor 17 has an axial rib 33, which radially protrudes (i.e. perpendicularly to the rotation axis 12) from the interior of part 29b towards the rotation axis 12 and axially extends (i.e. parallelly to the rotation axis 12) for a certain length. As better shown in FIGS. 8 and 9, the grip 11 internally has an axial seat 34 which is engaged by the axial rib 33 of the part 29b of the rotor 17 to make the rotor 17 angularly integral with the grip 11 and, at the same time, to allow an axial sliding (i.e. parallelly to the rotation axis 12) between the grip 11 and the rotor 17. By virtue of the coupling between the axial rib 33 of the part 29b of the rotor 17 and the seat 34 of the grip 11, the axial clearance of the grip 11 (which may not be ever completely eliminated) may be recovered without varying the distance between the turn 23 carried by the rotor 17 and the reader 18, which remains always constant and equal to a predetermined optimal value. In other words, the grip 11 may axially slide with respect to the rotor 17, therefore the axial movements of the grip 11 (which may not be ever completely eliminated to allow the rotation of the grip 11) do not affect the axial position of the rotor 17 (and thus the axial distance between the turn 23 carried by the rotor 17 and the reader 18 which remains always constant and equal to a predetermined optimal value).

According to a possible embodiment, the axial rib of the part 29b of the rotor 17 is thinner than the internal dimension of the seat 34 of the grip 11 so as to present a certain clearance (indicatively equal to 2°-6° of rotation) within the seat 34 itself; thereby, when the user rotates the grip 11, such a rotation is not immediately transmitted to the rotor 17, but is transmitted only after the clearance has been cancelled, therefore with a minor delay. Such a feature allows to reproduce the behavior of a traditional handle control provided with Bowden cables, in which the handle control has a given delay in transmitting torque requests due to the inevitable mechanical clearances. It is worth noting that several grips 11 having seats 34 of different size may be arranged in order to be able to vary the clearance of the grip 11 according to the driver's preferences.

In the embodiment shown in FIGS. 6-9, a single axial rib 33 protruding from the part 29b of the rotor 17 is provided, which is inserted into the corresponding axial seat 34 obtained in the grip 11; alternatively, several axial ribs 33 which are inserted into corresponding axial seats 34 may be provided. Furthermore, the axial rib 33 could also concern the part 29a of the rotor 17 or could concern only the part 29a of the rotor 17.

In order to block the axial sliding of the grip 11, a retaining element may be integrated in the supporting body 3, or a retaining element may be inserted into the end of the handlebar 2; the retaining element obviously prevents a relevant axial movement of the grip 11 and, at the same time, must allow the rotation of the grip 11 (therefore, the retaining element may not completely prevent minor movements of the grip 11, because it should provide the grip 11 with a certain axial clearance in order to allow the free rotation of the grip 11 itself).

As shown in FIG. 6, the part 29a of the rotor 17 comprises an angular cursor 35, which is inserted into a seat 36, which is circumference arc-shaped and defines the two stroke ends of the rotation of rotor 17 (and thus of grip 11) about the rotation axis 12. In other words, the cursor 35 is confined within the seat 36 and thus blocks the rotation of rotor 17 (and thus of grip 11) about the rotation axis 12 when it impacts against a wall of the seat 36.

According to the embodiments shown in FIGS. 10-13, a braking device 37 is provided, which serves the function of increasing the force needed to rotate the grip so as to reproduce the force needed to rotate a traditional handle control provided with Bowden cables. In other words, the rotation of a traditional handle control provided with Bowden cables requires a certain force both because of the friction offered by the Bowden cables, and because the rotation of a throttle body is controlled; on the other hand, as the rotation of the grip 11 does not involve any other mechanical elements, it does not require the application of additional forces except for the force needed to oppose the elastic force of the elastic element 13. Therefore, the function of the braking device 37 is to generate, by means of mechanical friction, a further force which opposes the rotation of the grip 11 for simulating the sensation of a traditional handle control provided with Bowden cables.

Figure 10:
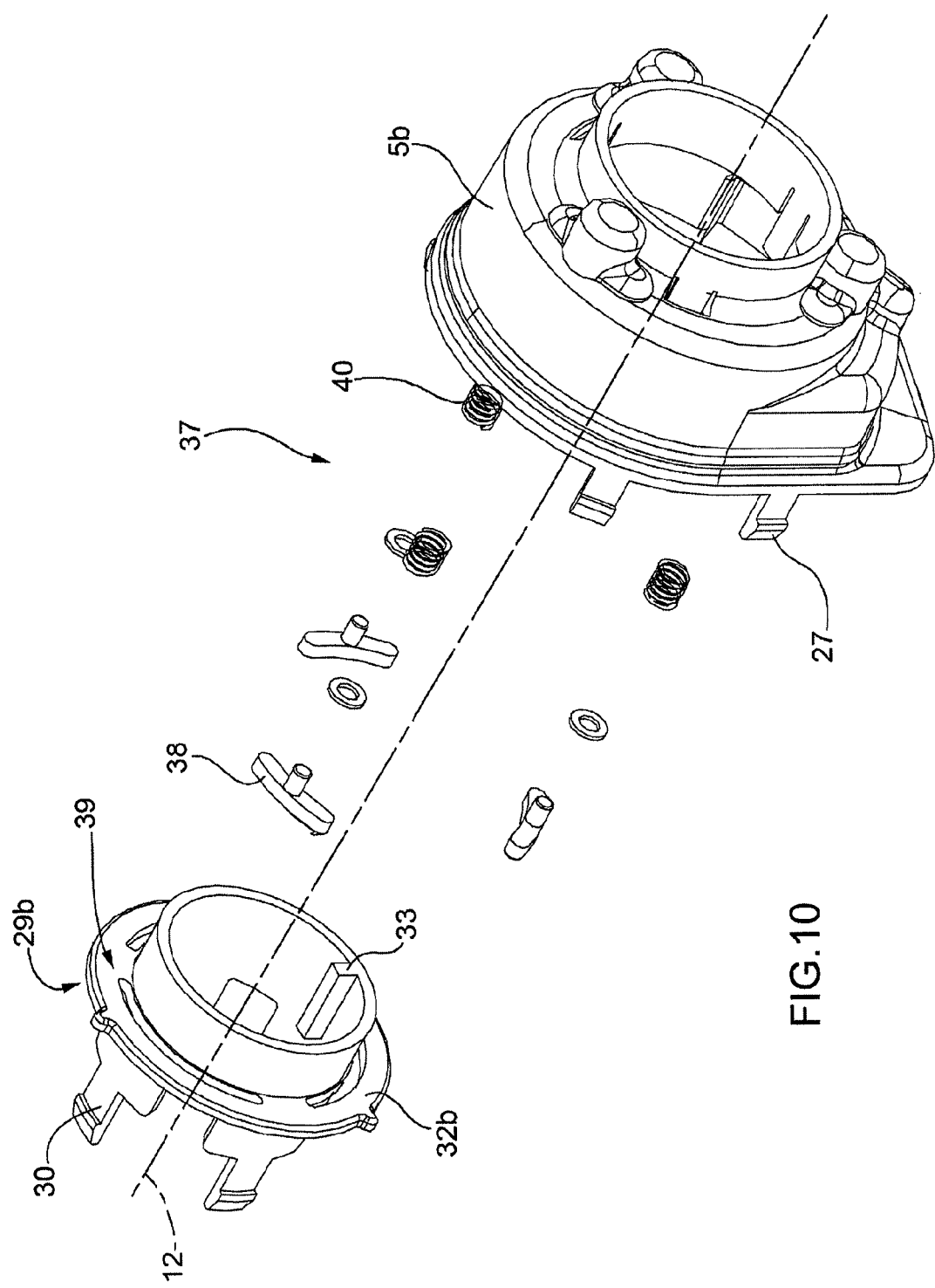
FIGS. 10-12 are three diagrammatic, exploded perspective views, with parts removed for clarity, of three variants of the supporting body in FIG. 5 provided with a braking device.

According to the embodiment shown in FIG. 10, the braking device 37 comprises three shoes 38, which are pressed against an annular friction surface 39 radially arranged (i.e. perpendicularly to the rotation axis 12) of the part 29b of the rotor 17 by three elastic elements 40 (specifically, three spiral springs). The three elastic elements 40 are compressed between the annular friction surface 39 of the part 29b of the rotor 17 and the part 5b of the supporting body 3. The annular friction surface 39 may be flat so that the braking action of the shoes 38 is constant in all the annular positions of the grip 11, or the annular friction surface 39 may have axial undulations so that the braking action of the shoes 38 varies according to the angular position of the grip 11.

According to a possible embodiment (not shown), each shoe 39 has an eccentric (i.e. a mass which exerts a thrust which may vary with the rotation speed of the mass itself due to the centrifugal force) so as to exert a braking force which varies according to the variations of the rotation speed of the rotor 17 (i.e. as the rotation speed of the grip 11 varies). The presence of eccentrics allows to accurately reproduce the sensation offered by a traditional handle control provided with Bowden cables, in which the opposing force increases according to the rotation speed of the handle.

Figure 11:
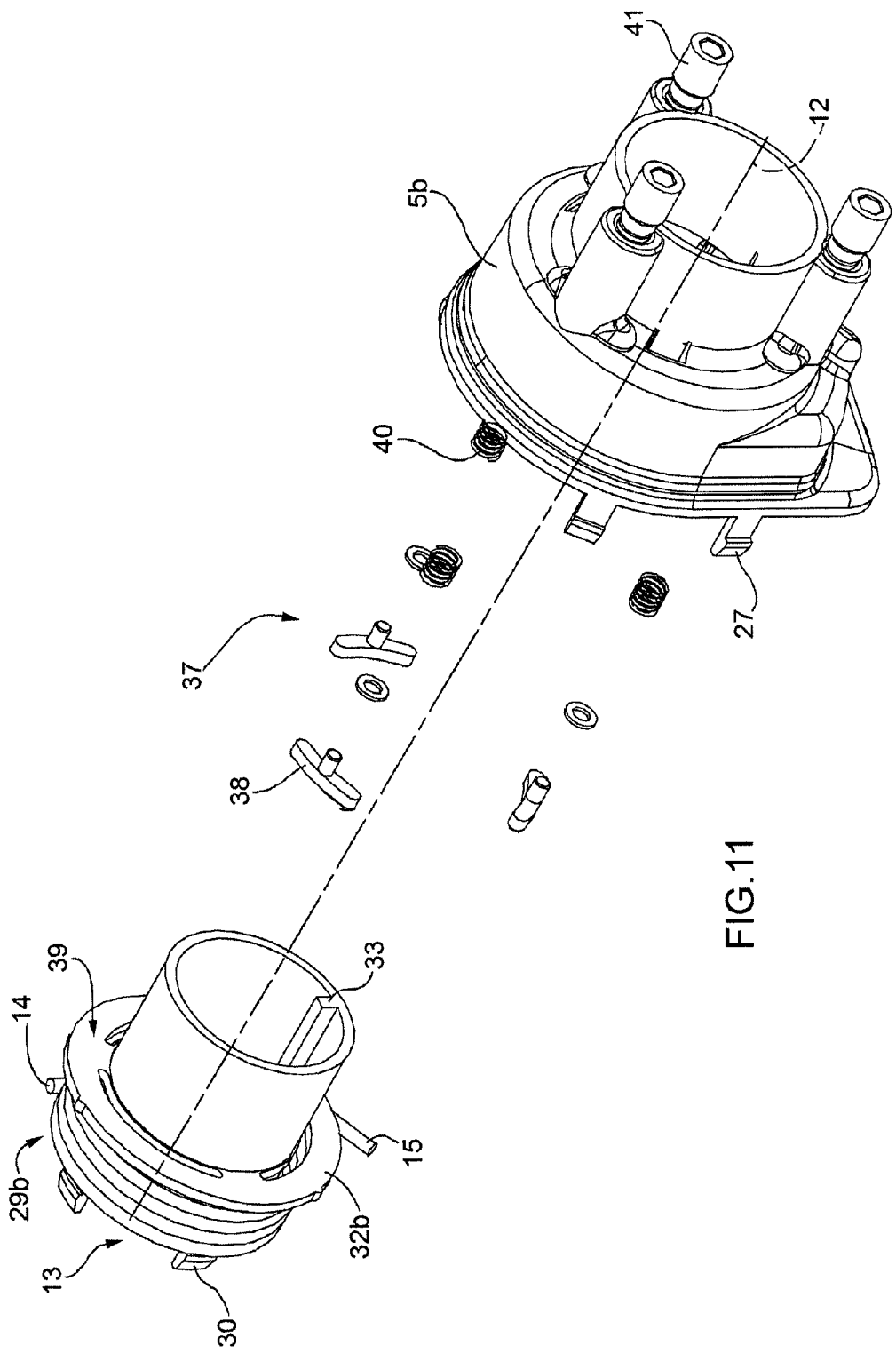

The embodiment shown in FIG. 11 differs from the embodiment shown in FIG. 10 in that it includes a corresponding adjustment screw 41 for each elastic element 40, which screw is screwed into a threaded hole obtained in the part 5b of the supporting body 3, is stopped by an o-ring and allows to adjust the load of the elastic element 40; thereby, by operating on the adjustment screws 41, the braking action of the braking device 37 may be varied to adapt it to one's needs.

Figure 12:
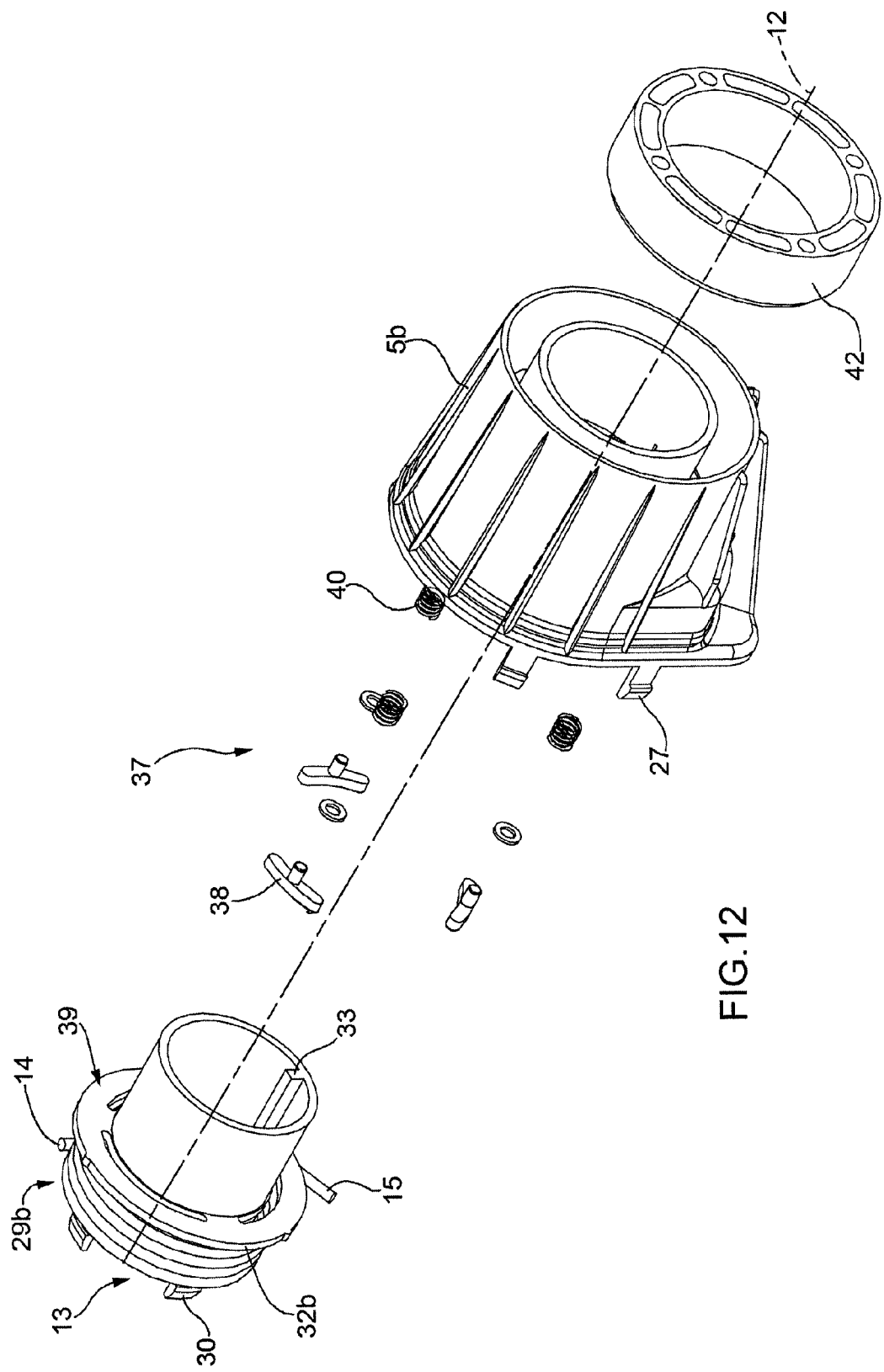

The embodiment shown in FIG. 12 differs from the embodiment shown in FIG. 11 in that the adjustment screws 41 are replaced by a threaded ring nut 42 which is screwed into a threaded hole obtained in the part 5b of the supporting body 3 and simultaneously acts on the three elastic elements 40 to adjust the load of the elastic elements 40 themselves.

In the embodiments shown in FIGS. 10-12, the shoes 38 of the braking system 37 are axially movable (i.e. parallelly to the rotation axis 12) and creep against the annular friction surface 39 radially arranged; according to an equivalent embodiment, the shoes 38 of the braking system are radially movable (i.e. perpendicularly to the rotation axis 12) and creep against the annular friction surface 39 axially arranged.

According to a further embodiment (not shown), the shoes 38 and the elastic elements 40 may be replaced by at least one annular elastic band which is carried by the part 5b of the supporting body 3, is compressed between the part 5b of the supporting body 3 and the annular friction surface 39 and thus creeps on the annular friction surface 39 itself thus generating a certain friction.

Figure 13:
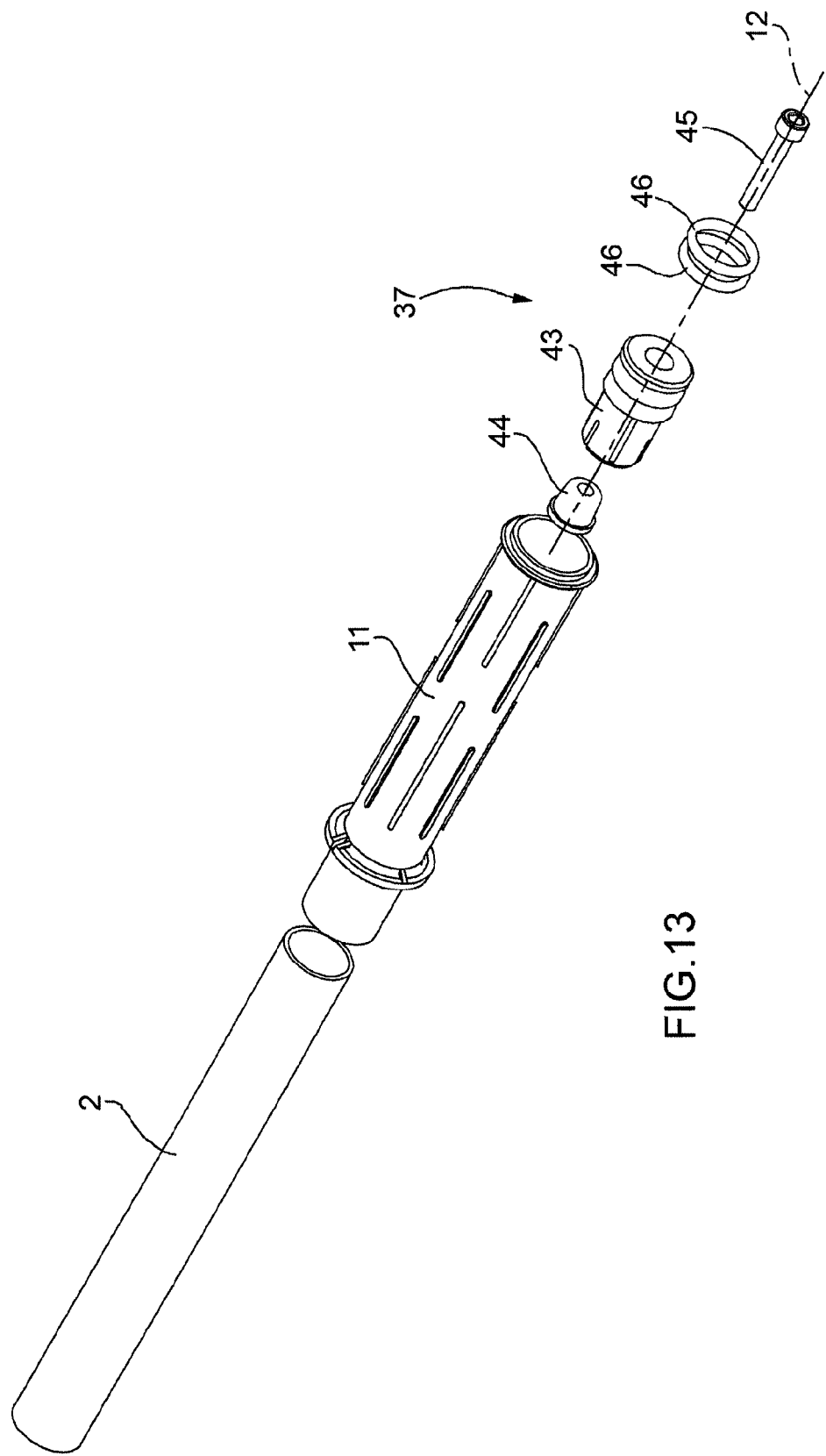
FIG. 13 is a diagrammatic, exploded perspective view, with parts removed for clarity, of a braking device coupled to a handlebar carrying the handle control in FIG. 1.

In the embodiment shown in FIGS. 10-12, the braking system 37 is carried by the supporting body 3 and acts on the rotor 17, in the embodiment shown in FIG. 13, instead, the braking system 37 is carried by the handlebar 2 (specifically, it is inserted inside the handlebar 2) and acts on the grip 11. In the embodiment shown in FIG. 13, the braking system 37 comprises a cylindrical insert 43, which is blocked inside the handlebar 2 by means of a counter cone 44 secured by a screw 45; the insert 43 partially protrudes from the handlebar 2 and supports two annular elastic bands 46 which generate a certain friction by creeping against an internal surface of grip 11.

According to a further embodiment (not shown), the above-described braking device 37, which is completely passive, is replaced by an active braking device 37 of the "Haptic" type, which comprises an electric motor adapted to apply a variable braking torque on the grip 11; such an electric motor may be used to apply a certain opposing torque to the grip 11 in order to simulate the sensation of a traditional handle control provided with Bowden cables (thus serving the function as the above-described braking device 37), but may also be used to transmit tactile sensations (e.g. vibrations or a greater difficulty in overcoming a certain rotation angle) to the driver's hand in order to indicate, for example, the exceeding of a speed limit or a loss of grip of the rear drive wheel. By way of example, when the rear drive wheel looses grip, the driver is "dissuaded" from further increasing the gas by applying a high opposing torque to the grip 11.

The above-described handle control 1 has many advantages, because it is simple and cost-effective to be implemented, very flexible because it may be easily installed in any type of motorcycle, and is structurally very similar to a handle control of traditional type, thus reducing the investments required for its implementation.

Furthermore, the above-descried handle control 1 ensures a standard solution for a motorcycle DBW system and integrates all "gas demand" functions and all the redundancies required for safety in a single object.

The above-described handle control 1 allows to obtain an accurate and, above all, very reliable measurement of the angular position α of the twist grip 11 and, even in the case of failure limited to the position sensor 16, allows to run the motorcycle under high safety conditions.

Finally, but not least importantly, the above-described handle control 1 is very reliable, because the angular position sensor 16 is not affected at all by the high existing vibrations, as it does not include a mechanical connection between the rotor 17 and the reader 18, and it is not negatively affected by possible metal objects arranged in the vicinity, as it does not include the use of permanent magnets. In particular, during the normal run of a motorcycle, the ends of the handlebar 2 are subjected to very high vibrations due to the amplifying effect of the handlebar 2 (i.e. a vibration transmitted to the handlebar 2 at a central area of fastening the handlebar to the front fork is multiplied by the arms of the handlebar 2 and therefore is highly amplified at the ends of the handlebar 2); such vibrations do not negatively affect the reading supplied by the angular position sensor 16, because there is no mechanical connection between the rotor 17 and the reader 18. Furthermore, given the contactless nature of the position sensor 16 employed, no wear phenomena occur over time which may determine malfunctions with consequent negative impacts on driver's safety.

The invention claimed is:

1. A handle control provided with an angular position sensor; the handle control comprises:
 a supporting body, which is provided with a central through hole and is adapted to be fitted about a handlebar to be rigidly fixed to the handlebar;
 a twist grip, which has a tubular shape, is rotationally carried by the supporting body and is centrally perforated to be fitted about the handlebar so as to rotate with respect to the handlebar; and
 an angular position sensor adapted to read the angular position of the twist grip and comprising at least one rotor, which is supported by the twist grip to rotate along with the twist grip, and at least one reader, which is carried in a stationary position by the supporting body, is arranged close to the rotor, and is suitable for a contactless and remote reading of the orientation of the rotor;
the handle control is characterized in that the rotor of the angular position sensor is magnetless, is adapted to influence an electric field, and comprises at least one closed turn made of an electrically conductive material and having a number of lobes distributed about a rotation axis of the twist grip; and
the reader of the angular position sensor generates an electric field, which is reflected by the turn of the rotor and then the reader reads the electric field reflected by the turn.

2. A handle control according to claim 1, wherein the reader of the angular position sensor comprises at least two electronic querying devices, which are reciprocally independent and are adapted to read the orientation of the rotor to provide at least two reciprocally redundant measurements.

3. A handle control according to claim 2, wherein the reader comprises a number of antennas, each of which is electrically coupled to the rotor and is connected to the electronic querying devices.

4. A handle control according to claim 3, wherein the reader comprises a common printed circuit, which is arranged inside the supporting body and carries the antennas and the electronic querying devices.

5. A handle control according to claim 2, wherein the rotor of the angular position sensor comprises a single common closed turn, the orientation of which is read by the two electronic querying devices.

6. A handle control according to claim 1 and comprising at least one elastic recalling element, which is arranged inside the supporting body and has a first end coupled to the twist grip and a second end secured to the supporting body to exert an elastic thrust on the twist grip, which tends to rotate the twist grip towards a rest position corresponding to a zero driving torque; the rotor supporting the closed turn is divided into two parts which are mechanically coupled to each other; an elastic element is inserted between the two parts of the rotor, which elastic element is axially contained between the two parts themselves.

7. A handle control according to claim 1, wherein:
 the rotor has at least one axial rib, which radially protrudes towards a rotation axis and axially extends for a certain length; and
 the grip internally has an axial seat which is engaged by the axial rib of the part of the rotor to make the rotor angularly integral with the grip and, at the same time, to allow an axial sliding between the grip and the rotor without varying the distance between the rotor and the reader.

8. A handle control according to claim 7, wherein the axial rib of the rotor is thinner than the internal dimension of the seat of the grip so as to present a certain clearance within the seat itself.

9. A handle control according to claim 1, wherein the rotor comprises an angular cursor, which is inserted into a seat, which is circumference arc-shaped and defines the two stroke ends of the rotation of the rotor.

10. A handle control according to claim 1 and comprising a braking device, which serves the function of increasing the force needed to rotate the grip.

11. A handle control according to claim 10, wherein the braking device increases the force needed to rotate the grip by means of friction.

12. A handle control according to claim 11, wherein the braking device comprises:
 at least one shoe;
 a friction surface integral with the rotor; and
 an elastic element which biases the shoe against the friction surface.

13. A handle control according to claim 12, wherein the friction surface has undulations so that the braking action of the shoe varies according to the angular position of the grip.

14. A handle control according to claim 12, wherein the shoe has an eccentric so as to exert a braking force which varies according to the variations of the rotation speed of the rotor.

15. A handle control according to claim 11, wherein the braking system is carried by the handlebar and acts on the grip.

16. A handle control according to claim 15, wherein the braking device comprises:
- a cylindrical insert which is blocked inside the handlebar and partially protrudes from the handlebar; and
- at least one annular elastic band which is supported by the insert and creeps against an internal surface of the grip to generate a certain friction.

17. A handle control provided with an angular position sensor; the handle control comprises:
- a supporting body, which is provided with a through central hole and is adapted to be fitted about a handlebar to be rigidly fixed to the handlebar itself;
- a twist grip, which has a tubular shape, is rotationally carried by the supporting body and is centrally perforated to be fitted about the handlebar so as to rotate with respect to the handlebar itself; and
- an angular position sensor which is adapted to read the angular position of the twist grip and comprises at least one rotor, which is supported by the twist grip to rotate along with the twist grip itself, and at least one reader, which is carried in a fixed position by the supporting body, is arranged close to the rotor, and is adapted for a contactless and remote reading of the orientation of the rotor itself;

the handle control is characterized in that:
- the rotor has at least one axial rib, which radially protrudes towards a rotation axis and axially extends for a certain length; and
- the grip internally has an axial seat which is engaged by the axial rib of the part of the rotor to make the rotor angularly integral with the grip and, at the same time, to allow an axial sliding between the grip and the rotor without varying the distance between the rotor and the reader.

18. A handle control provided with an angular position sensor; the handle control comprises:
- a supporting body, which is provided with a through central hole and is adapted to be fitted about a handlebar to be rigidly fixed to the handlebar itself;
- a twist grip, which has a tubular shape, is rotationally carried by the supporting body and is centrally perforated to be fitted about the handlebar so as to rotate with respect to the handlebar itself; and
- an angular position sensor which is adapted to read the angular position of the twist grip and comprises at least one rotor, which is supported by the twist grip in order to rotate along with the twist grip itself, and at least one reader, which is carried in a fixed position by the supporting body, is arranged close to the rotor, and is adapted for a contactless and remote reading of the orientation of the rotor itself;
- the handle control is characterized in that it comprises a braking device, which serves the function of increasing the force needed to rotate the grip.

* * * * *

UNITED STATES PATENT AND TRADEMARK OFFICE
CERTIFICATE OF CORRECTION

PATENT NO. : 8,353,111 B2  
APPLICATION NO. : 12/549980  
DATED : January 15, 2013  
INVENTOR(S) : Baldassari et al.

Page 1 of 1

It is certified that error appears in the above-identified patent and that said Letters Patent is hereby corrected as shown below:

On the Title Page, Item [73] should read

(73) Assignee: Magneti Marelli S.p.A., Corbetta, ~~(ID)~~ (IT)

On the Title Page, Item [30] should read

(30) Foreign Application Priority Data

Nov. 26, 2008 (EP) ................................ 08425761.7

May 19, 2009 (EP) ................................ 09160703.6

Signed and Sealed this  
Fourth Day of June, 2013

Teresa Stanek Rea  
*Acting Director of the United States Patent and Trademark Office*